United States Patent
Birman et al.

(10) Patent No.: US 10,636,382 B2
(45) Date of Patent: Apr. 28, 2020

(54) AUTOMATICALLY ADJUSTABLE DISPLAY FOR VEHICLE

(71) Applicant: Continental Automotive Systems, Inc., Auburn Hills, MI (US)

(72) Inventors: Vyacheslav Birman, Auburn Hills, MI (US); Tian Bai, Auburn Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 52 days.

(21) Appl. No.: 15/967,744

(22) Filed: May 1, 2018

(65) Prior Publication Data
US 2019/0340997 A1 Nov. 7, 2019

(51) Int. Cl.
*G09G 5/00* (2006.01)
*B60K 35/00* (2006.01)

(52) U.S. Cl.
CPC .......... *G09G 5/003* (2013.01); *B60K 35/00* (2013.01); *B60K 2370/52* (2019.05); *B60K 2370/70* (2019.05); *G09G 2320/068* (2013.01); *G09G 2380/10* (2013.01)

(58) Field of Classification Search
CPC .................................................. G09G 5/003
USPC .................................................. 345/581
See application file for complete search history.

(56) References Cited

U.S. PATENT DOCUMENTS

| | | | | |
|---|---|---|---|---|
| 2009/0128317 | A1* | 5/2009 | Hideshiro | B60K 35/00 340/459 |
| 2016/0314763 | A1* | 10/2016 | Matthews | G09G 5/02 |
| 2017/0313248 | A1* | 11/2017 | Kothari | B60K 35/00 |

* cited by examiner

*Primary Examiner* — Shivang I Patel

(57) ABSTRACT

A disclosed adjustable display assembly includes a display viewable by a vehicle occupant, a mount supporting the display relative to the vehicle occupant. The mount is movable to adjust a position of the display relative to the vehicle occupant. A controller receives information utilized to determine an orientation of the display that would result in a reflection effecting viewing of the display by the vehicle occupant and commanding movement of the mount to eliminate reflections on the display viewable by the vehicle occupant.

19 Claims, 4 Drawing Sheets

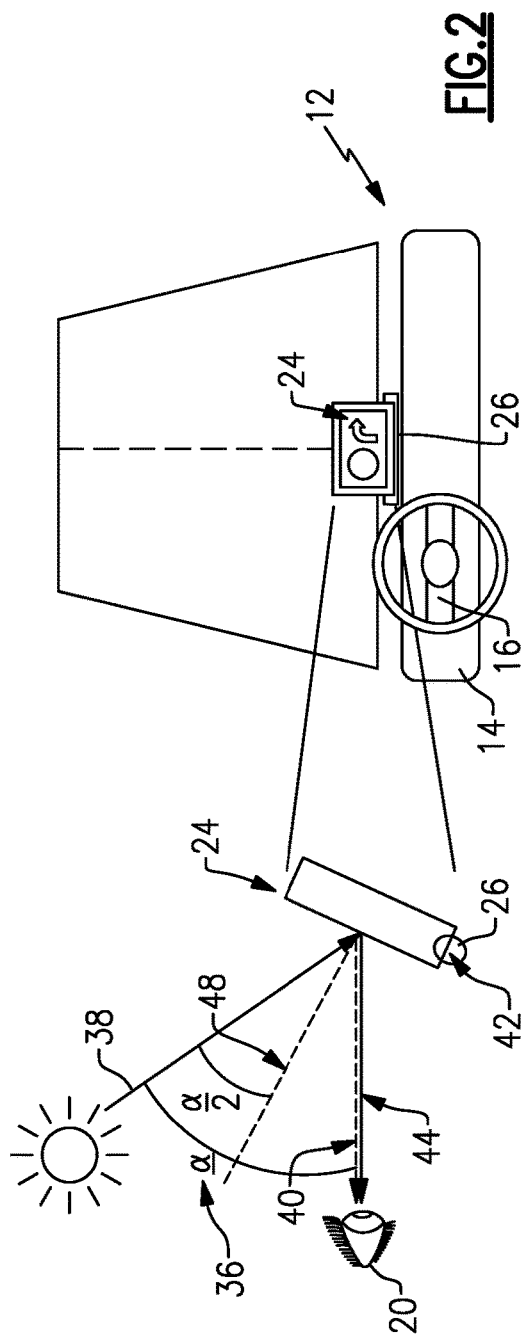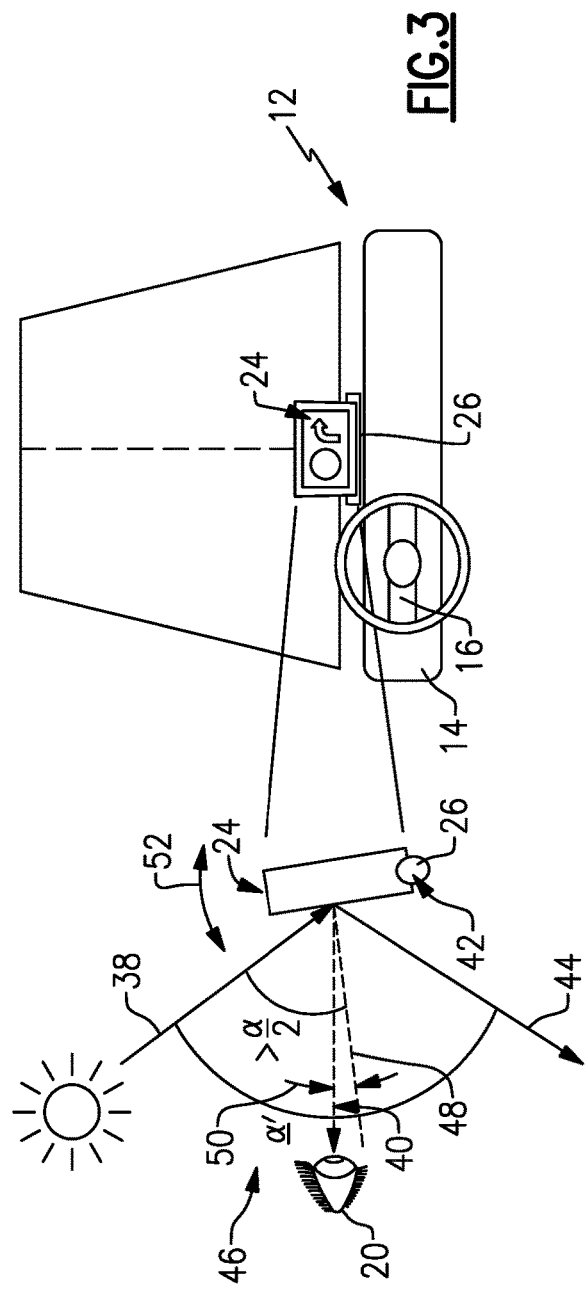

020
AUTOMATICALLY ADJUSTABLE DISPLAY FOR VEHICLE

TECHNICAL FIELD

The present disclosure relates to displays mounted separate from a vehicle instrument panel that are subject to direct sunlight and specifically to a display that adjusts automatically to reduce glare.

BACKGROUND

Vehicles include instrument panels to communicate information indicative of vehicle operation and performance to an operator. The instrument panel can include several gauges and dials that communicate vehicle conditions such as speed, engine rpm, temperature, oil pressure along with many other operational parameters. Some gauges and displays are mounted separate from the instrument panel. Displays that are not mounted within a vehicle dashboard may be exposed to direct sunlight that can reduce visibility to the driver. In vehicles with a convertible top, glare from sunlight can cause increased difficulties in viewing separately mounted displays.

Automotive original equipment suppliers continually strive to improve quality, reduce costs and maintain customer interest with new products and aesthetic design features.

SUMMARY

A disclosed adjustable display embodiment includes, among other possible things, a display viewable by a vehicle occupant and a mount supporting the display relative to the vehicle occupant. The mount is movable to adjust a position of the display relative to the vehicle occupant. A controller receives information utilized to determine an orientation of the display that would result in a reflection effecting viewing of the display by the vehicle occupant and commands movement of the mount to eliminate reflections on the display viewable by the vehicle occupant.

In a further embodiment of any of the foregoing adjustable displays, the controller receives information indicative of a position of the sun relative to the display and the controller moves the mount to adjust a position of the display relative to the vehicle occupant to eliminate reflections from the sun.

In a further embodiment of any of the foregoing adjustable displays, the controller receives information indicative of a time and position of the vehicle and determines a position of the sun relative to a horizon based on the received time and position.

In a further embodiment of any of the foregoing adjustable displays, the controller receives information indicative of a position of the vehicle occupant relative to the display and the controller uses the information indicative of the position of the vehicle occupant and the position of the sun to prevent specular reflections on the display from being viewable by the vehicle occupant.

In a further embodiment of any of the foregoing adjustable displays, the controller modifies how information is shown on the display to correspond with a relative orientation between the display and the vehicle occupant.

In a further embodiment of any of the foregoing adjustable displays, modification of information on the display changes a visual appearance of information on the display based on an angle of the display relative to the vehicle occupant.

In a further embodiment of any of the foregoing adjustable displays, the display is supported by the mount above and separate from an instrument panel.

In a further embodiment of any of the foregoing adjustable displays, movement of the display comprises movement about a horizontal axis.

In a further embodiment of any of the foregoing adjustable displays, movement of the display comprise movement in one of a counterclockwise and counter-clockwise direction.

In a further embodiment of any of the foregoing adjustable displays, wherein the display provides a display of a rear of the vehicle and the mount supports the display above an instrument panel.

A disclosed method of improving readability of a display in a motor vehicle includes, among other possible things, receiving information indicative of position of the vehicle relative to the sun with a controller, receiving information indicative of a position of a vehicle occupant with the controller, and adjusting a position of a display automatically with the controller utilizing information indicative of the position of the vehicle, sun and the vehicle occupant to direct any reflection away for the vehicle occupant.

In a further embodiment of any of the foregoing methods of improving readability of a display for a motor vehicle, the display is mounted for rotation about a horizontal axis and adjusting the position of the display includes adjusting an angle of the display relative to the sun about the horizontal axis.

In a further embodiment of any of the foregoing methods of improving readability of a display for a motor vehicle, information of the vehicle position is obtained from a global positioning system within the vehicle.

In a further embodiment of any of the foregoing methods of improving readability of a display for a motor vehicle, information is obtained pertaining to a position of the sun relative to the horizon is used to adjust an angle of the display.

In a further embodiment of any of the foregoing methods of improving readability of a display for a motor vehicle, the display is mounted above an instrument cluster of the vehicle.

In a further embodiment of any of the foregoing methods of improving readability of a display for a motor vehicle, an image shown on the display is modified based on an angle of the display relative to a vehicle occupant.

In a further embodiment of any of the foregoing methods of improving readability of a display for a motor vehicle, detecting a position of the vehicle occupant with a camera located in the vehicle.

In a further embodiment of any of the foregoing methods of improving readability of a display for a motor vehicle, wherein the controller receives information indicative of a location of the vehicle, date and time and determines the location of the sun relative to the horizon and vehicle based on the position of the received information.

In a further embodiment of the foregoing method of improving readability of a display for a motor vehicle, the controller adjusts the images shown on the display to accommodate an angular position of the display.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view of the example system for adjusting a display.

FIG. 3 is another schematic view of the system for adjusting a display.

DETAILED DESCRIPTION

Figure 1:
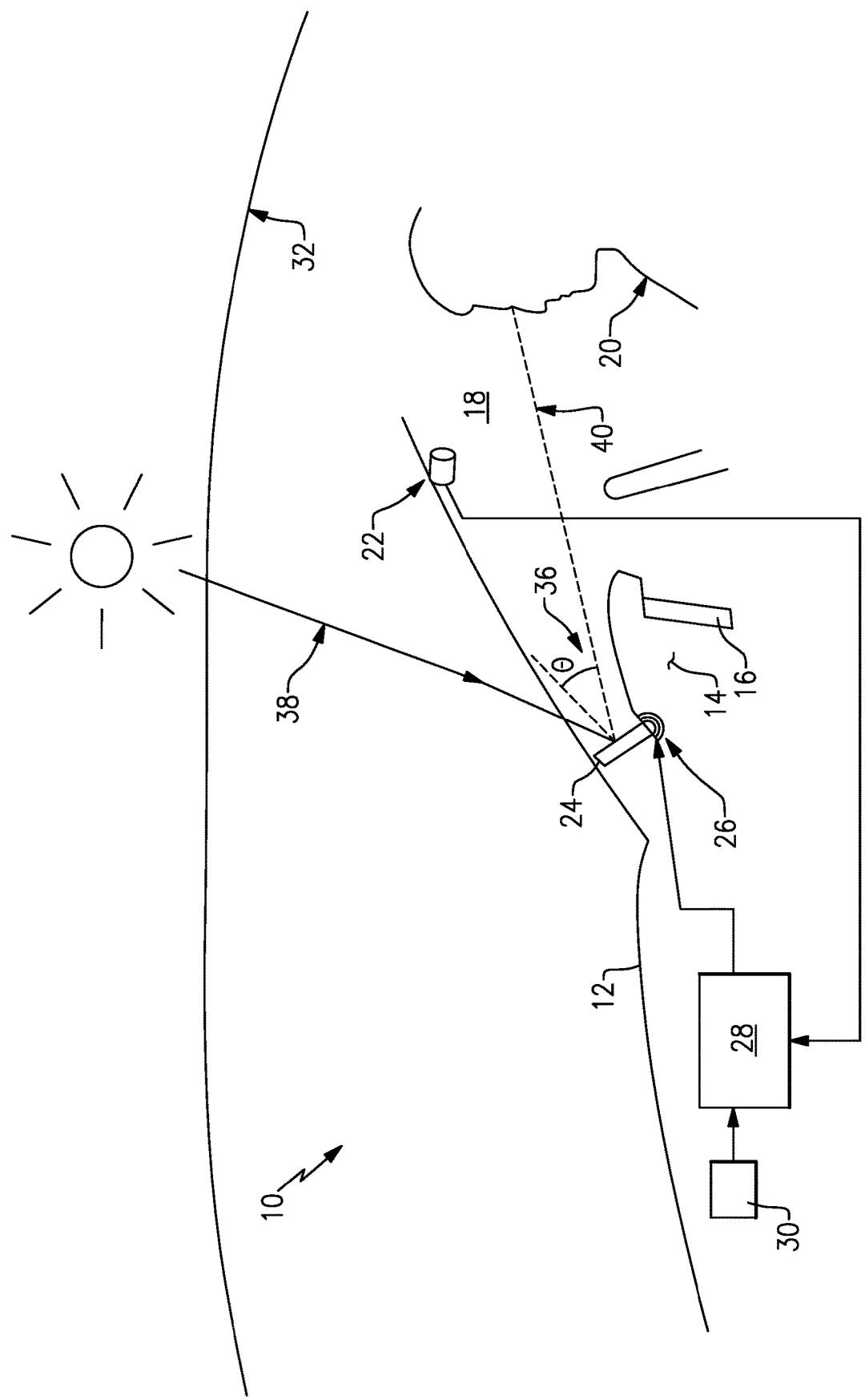
FIG. 1 is a schematic view of a vehicle including a system according to an example embodiment.

Referring to FIG. 1, a vehicle 12 is schematically shown and includes a system 10 for adjusting an angle 36 of a display 24. The display 24 is visible by a vehicle operator 20 and provides information indicative of vehicle operating parameters. The example display 24 is mounted atop a dashboard 14 and instrument panel 16. Both the instrument panel 16 and the display 24 provide information visible to the vehicle operator 20 seated within the vehicle cabin 18.

The position of the display 24 expose it to sunlight schematically shown at 38 that can cause a reflection 40. The reflection 40 can distort and limit the vehicle operator's ability to read the display 24. Accordingly, the disclosed system 10 provides for movement of the display 24 relative to a position of the sun to eliminate visibility problems caused by direct sunlight 38. A mount 26 supports the display 24 and is movable about an axis to adjust an angle 36 to redirect any reflection caused by sunlight 38 away from the vehicle operator 20.

The example system 10 includes a controller 28 that utilizes information indicative of a vehicle position provided by a GPS 30, the time of day, and the orientation of the vehicle occupant 20 provided by a camera 22 to change a position of the display 24. The GPS module 30 provides information indicative of vehicle position and the time of day. The camera 22 provides information indicative of a location of the vehicle operator 20 relative to the display 24. Although the camera 22 is disclosed by way of example, other means of determining a position of the operator 20 are within the contemplation of this disclosure. Moreover, the position of the operator 20 may also be estimated based on accepted occupant sizes and ranges.

The controller 28 utilizes the obtained information to determine an orientation of the sun relative to horizon 32 and further in relation to the display 24. Utilizing this information gathered by the GPS 30 as well as time and date information, the controller 28 determines an orientation of the sun relative to the horizon 32 to determine a probable angle of sunlight 38 directed at the display 24. The controller 28 uses this determination to command movement of the mount 26 to adjust a position of the display 24. The example mount 26 is movable by way of an electric stepper motor or other known actuator that is capable of small incremental movement of the display 24. Moreover, the mount 26 also includes features that communicate a current position of the display 24 about the axis 42 to the controller 28. Repositioning of the display 24 redirects reflections caused by sunlight 38 such to eliminate distortions that can inhibit the vehicle operator's view of images on the display 24.

It should be understood that the controller 28 may be a processor including hardware for executing software, particularly software stored in memory. The processor can be a custom made or commercially available processor, a central processing unit (CPU), an auxiliary processor among several processors associated with the computing device, a semi-conductor based microprocessor (in the form of a microchip or chip set) or generally any device for executing software instructions. The controller 28 may be part of the overall vehicle controller or separate controller used for the disclosed display adjustment system 10.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Referring to FIGS. 2 and 3 with continued reference to FIG. 1, the example display 24 is pivotally movable by the mount 26 about a horizontal axis 42. Sunlight 36 from the directed at the display 24 reflects at an angle 36. Once the direction of the sunlight 38 is known, the angle 36 can be adjusted to direct the reflection away from the operator 20.

The controller 28 determines the angle 36 of the sunlight 38 by determining the position of the sun relative to a position of the vehicle 12. The controller 28 utilizes information about the position of the vehicle 12, the time of day and date in addition to standard known information regarding the position of the sun to determine the direction of the sunlight. As appreciated, the position of the sun for any given time of any given day for a given position on earth is known and can be obtained either through a look up table contained within the controller 28 or through access to a database through a communication link. The communication link could be exclusive to the system 10, part of the vehicle communication link or part of a cellular link communicated to the vehicle 12.

Information about the location of the sun is used to determine the angle 36. Once the angle 36 is known it is combined with knowledge of a current position of the display 24 about the axis 42 and the position of the operator 20 to determine if the reflection 44 will interfere with the operator's view of the display 24. The current position of the display 24 is provided by the mount 26 as part of operation. As appreciated, a range of angles 36 would be understood to impact the view of the operator and prompt the controller 28 to command adjustment of the display 24.

The controller 28 generates command signals causing the mount 26 to rotate the display 24 about the horizontal axis 42 in a clockwise or counter-clockwise direction indicated by arrow 52. Rotation of the display 24 changes the incident angle 36 of sunlight 38 on the display 24 such that reflections from the display 24 indicated at 44 are directed at an angle 46. The angle 46 is determined to direct reflection 44 away from the vehicle operator 20 such that a view of the display 24 is clear and not interrupted or impeded by glare of the sunlight 38.

It should be appreciated that the display 24 includes an optimal viewing sightline schematically indicated at 48 that may be adjusted away from a direct viewing to eliminate glare. An offset indicated by angle 50 from the sightline 48 can distort the perceived images on the display 24. Accordingly, the example system 10 includes features for correcting distortion of images displayed on the display 24.

Figure 4:
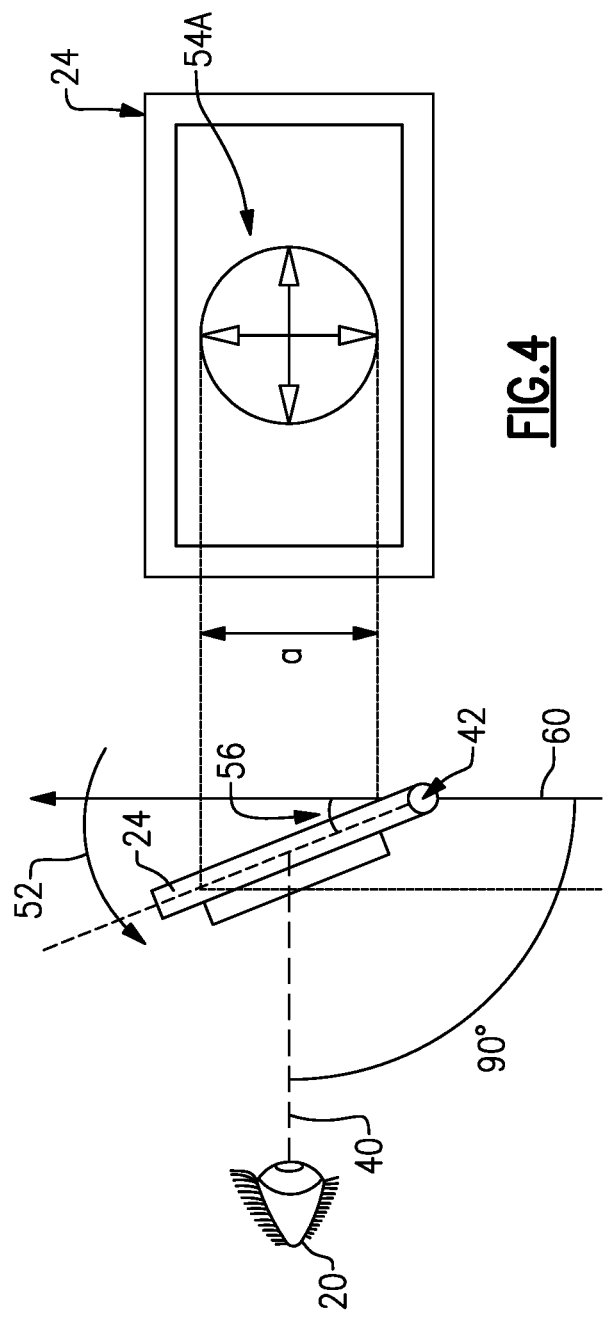
FIG. 4 is a schematic view of an image as perceived on an example display.
Figure 5:
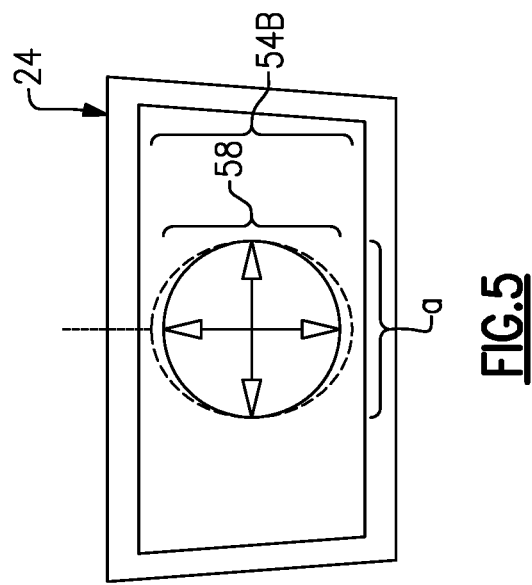
FIG. 5 is a schematic view of the image as actually displayed and as perceived.

Referring to FIGS. 4 and 5, the example system 10 includes features for modifying an actual image 54A shown on the display 24 to accommodate the angular movement away from the optimal sightline 40. The actual image 54A is modified such that a perceived image seen by the operator 20 maintains the proportions of the actual image. FIG. 4 schematically shows the actual image 54A as it would look like if viewed along a direct line of sight without the display angled. This actual image 54A is modified based on an angle 56 of the display 24 relative to a vertical plane 60. In this example, the image 54A is not modified when the display 24 is disposed within the vertical plane 60. The sight line 40 is disposed at right angle relative to the plane 60. The 90 degree viewing angle still applies when the display 24 is pivoted to the angle 56.

The image 54A viewed at the angle 56 would be distorted if not modified. Accordingly, the actual image 54A is modified as shown in FIG. 5 and indicated at 54B. The actual image 54A (FIG. 4) is modified to provide a modified image 54B (FIG. 5) such that when viewed along the sightline 40 it will be perceived as normal as indicated at 58. Accordingly, the viewed perceived image 58 will look normal to the operator 20. In other words, the image 54A on the display 24 is modified as shown at 54B to provide a perceived normal image indicated by 58. The modification of the shapes on the display 24 are performed utilizing the known angle 56 along with the known position of the operator 20 provided by the camera 22 (FIG. 1). The methodology of changing the shapes and information on the display 24 based on the angle 56 from the sight line 40 include known methods and computations that are performed by the controller 28.

Figure 6:
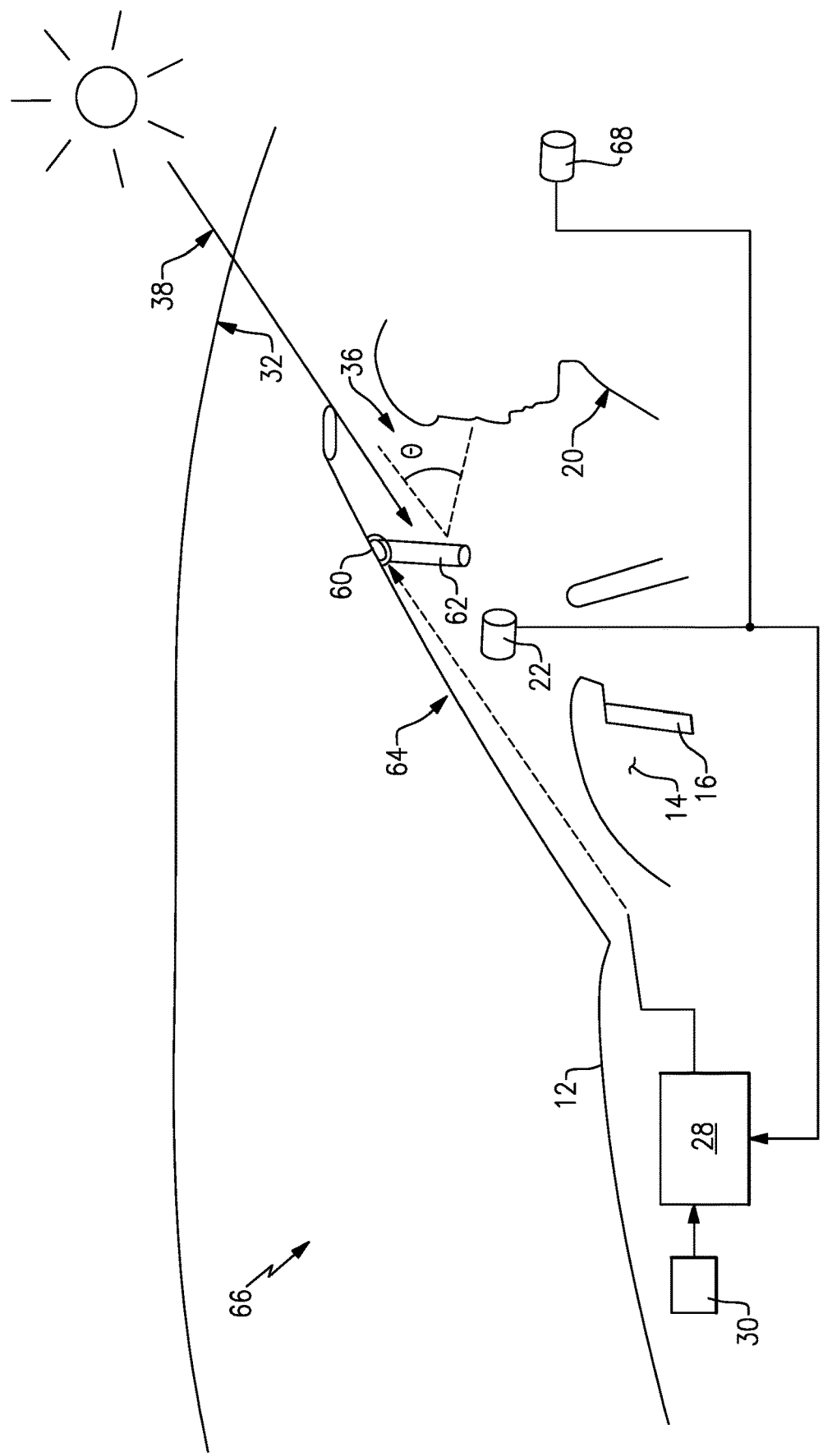
FIG. 6 is a schematic view of another example system for adjusting a display.

Referring to FIG. 6, another example system 66 for adjusting a display 62 is shown schematically. The example system 66 includes a mount 60 for supporting the display 62 in a position common for a rear view mirror such as on a windshield 64. In this example, the display 62 replaces the rear view mirror and displays a view of the rear of the vehicle using a camera 68 located in a location where the rear view can be obtained. The example mount 60 operates to adjust an angle 36 of the display 66 based on a position of the operator 20 and the sun to reduce and/or eliminate viewing problems caused by direct sunlight 38. As appreciated, the example vehicle may be a convertible or include a sunroof or transparent roof that allows sunlight to shine on the display 62 in a manner that can detract from images presented on the display 62.

Accordingly, the example system 10 adjusts the display 24 based on information obtained by a controller indicative of a position of the sun relative to a display mounted within the motor vehicle to prevent reflections from impeding legibility of information presented on the display 24. Moreover, the example system 10 adjusts images on the display to accommodate departures from desires sight lines.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An adjustable display assembly for a vehicle comprising:
   a display viewable by a vehicle occupant;
   a mount supporting the display relative to the vehicle occupant, the mount movable to adjust a position of the display relative to the vehicle occupant; and
   a controller for receiving information utilized to determine an orientation of the display that would result in a reflection effecting viewing of the display by the vehicle occupant and commanding movement of the mount to eliminate reflections on the display viewable by the vehicle occupant, wherein movement of the mount includes movement of the display away from an optimal line of sight and the controller modifies an image shown on the display to provide an image as would be perceived with the display disposed along the optimal line of sight.

2. The adjustable display assembly as recited in claim 1, wherein the controller receives information indicative of a position of the sun relative to the display and the controller moves the mount to adjust a position of the display relative to the vehicle occupant to eliminate reflections from the sun.

3. The adjustable display assembly as recited in claim 2, wherein the controller receives information indicative of a time and position of the vehicle and determines a position of the sun relative to a horizon based on the received time and position.

4. The adjustable display assembly as recited in claim 2, wherein the controller receives information indicative of a position of the vehicle occupant relative to the display and the controller uses the information indicative of the position of the vehicle occupant and the position of the sun to prevent specular reflections on the display from being viewable by the vehicle occupant.

5. The adjustable display assembly as recited in claim 2, wherein the controller modifies the image shown on the display to provide a modified image such that the when viewed along a non-optimal sightline the modified image will be perceived as if the image where disposed along the optimal sightline between the display and the vehicle occupant.

6. The adjustable display assembly as recited in claim 5, wherein the optimal sightline between the display and vehicle occupant includes a normal angel between a plane of the display an eye of the operator and modification of information on the display changes a visual appearance of the image based on an angle of the display away from the normal angle relative to the vehicle occupant.

7. The adjustable display assembly as recited in claim 1, including an instrument panel and the display is supported by the mount above and separate from the instrument panel.

8. The adjustable display assembly as recited in claim 1, wherein movement of the display comprises movement about a horizontal axis.

9. The adjustable display assembly as recited in claim 8, wherein movement of the display comprise movement in one of a clockwise and counterclockwise direction.

10. The adjustable display assembly as recited in claim 1, wherein the display provides a display of a rear of the vehicle and the mount supports the display above an instrument panel.

11. A method of improving readability of a display in a motor vehicle comprising:
receiving information with a controller indicative of position of the vehicle relative to the sun;
receiving information with a controller indicative of a position of a vehicle occupant;
adjusting a position of a display automatically with the controller utilizing information indicative of the position of the vehicle, sun and the vehicle occupant to direct any reflection away for the vehicle occupant, wherein adjusting the position of the display includes movement of the display away from optimal line of sight for a vehicle operator; and
modifying an image shown on the display to provide an image as would be perceived with the display disposed along the optimal line of sight.

12. The method as recited in claim 11, wherein the display is mounted for rotation about a horizontal axis and adjusting the position of the display includes adjusting an angle of the display relative to the sun about the horizontal axis.

13. The method as recited in claim 12, including obtaining information of the vehicle position from a global positioning system within the vehicle.

14. The method as recited in claim 13, including using information obtained pertaining to a position of the sun relative to the horizon to adjust an angle of the display.

15. The method as recited in claim 11, wherein the display is mounted above an instrument cluster of the vehicle.

16. The method as recited in claim 11, wherein modifying the image shown on the display includes modification of the image such that when viewed along a non-optimal line of sight the modified image will be perceived as if the image where disposed along an optimal line of sight by a vehicle occupant.

17. The method as recited in claim 11, including detecting a position of the vehicle occupant with a camera located in the vehicle.

18. The method as recited in claim 11, wherein the controller receives information indicative of a location of the vehicle, date and time and determines the location of the sun relative to the horizon and vehicle based on the position of the received information.

19. The method as recited in claim 18, wherein the controller adjusts the images shown on the display to accommodate an angular position of the display.

\* \* \* \* \*